March 18, 1969  J. W. JACOBS  3,433,030
AUTOMATIC LIQUID FREEZER
Filed June 19, 1967  Sheet 1 of 2

INVENTOR.
James W. Jacobs
BY
Carl A. Stickel
ATTORNEY

INVENTOR.
James W. Jacobs
BY
Carl A. Stickel
ATTORNEY

United States Patent Office 3,433,030
Patented Mar. 18, 1969

3,433,030
AUTOMATIC LIQUID FREEZER
James W. Jacobs, Dayton, Ohio, assignor to General Motors Corporation, Detroit, Mich., a corporation of Delaware
Filed June 19, 1967, Ser. No. 647,075
U.S. Cl. 62—186                6 Claims
Int. Cl. F25c 1/04, 5/08; F25d 17/04

ABSTRACT OF THE DISCLOSURE

An automatic ice cube making machine wherein water is fed through a distributing manifold which drops the water into troughs formed in the tops of plastic fingers, each provided with a first electric heater extending along the finger and a second electric heater surrounding the water feed opening to the finger. Freezing air is circulated around the fingers to freeze the liquid as it accumulates on the fingers. A timer stops the water flow and energizes the first heaters extending along the fingers to release the frozen liquid which falls into a bin provided with a weight responsive stop switch. The stop switch stops the operation of the system when the bin is filled.

---

This invention pertains to automatic liquid freezers for house-hold refrigerators. Liquid freezers for household refrigerators have been complicated and expensive and have not produced clear ice since their freezing processes trap the dissolved air or gas in the ice.

It is an object of this invention to provide a simple inexpensive automatic liquid freezer for household refrigerators which will produce ice of greater clarity.

It is another object of this invention to provide a simple inexpensive automatic liquid freezer in which the liquid is frozen in a manner similar to an icicle in a stream of air maintained at below freezing temperatures.

It is another object of this invention to provide a simple inexpensive automatic liquid freezer in which the air and gases can freely escape as the ice is formed in thin layers.

These and other objects are attained by flowing the liquid to be frozen in the shape of icicles onto the upper portion of downwardly extending fingers in a stream of freezing air.

Further objects and advantages of the present invention will be apparent from the following description, reference being had to the accompanying drawings, wherein preferred embodiments of the present invention are clearly shown.

Figure 1:
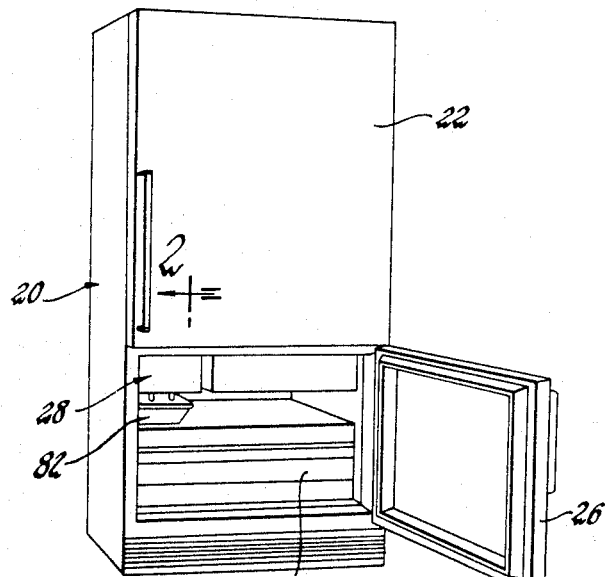
FIGURE 1 is a perspective view of a household refrigerator with the freezing compartment door open illustrating one form of my liquid freezer.

Referring now to the drawings and more particularly to FIGURE 1, there is shown a household refrigerator cabinet 20 having an upper door 22 closing upon the above freezing compartment and a lower below freezing compartment 24 closed by a lower door 26. Preferably, this household refrigerator 20 is of the frost-free type in which air at a temperature of about −10° below zero is circulated through the below freezing compartment 24.

According to my invention an automatic liquid freezer or ice maker 28 is installed in the below freezing compartment 24. This liquid freezer is supplied with tap water at ordinary temperatures through a water supply pipe 30 from a suitable water supply. This pipe 30 connects to an insulated enclosure 32 of a suitable electrical insulating plastic containing a heat and electrical insulating material 34. The plastic 32 as well as the heat and electrical insulating material 34 insulates the water supply from the cold air flowing in the compartment 24. Within the enclosure 32 a normally closed solenoid valve 36 connects the supply pipe 30 to a water distributing manifold 38 provided with ten branch discharge pipes 40.

Each of these discharge pipes 40 is provided with an outlet which terminates above a trough 42 provided in the top of each of the ten finger shaped supports 44. Each of these finger shaped supports 44 includes the top portion 46 provided with a flange 48 resting upon the bottom wall 50 of the enclosure 32. The remainder of the top 46 projects through an aperture in the bottom wall 50 of the enclosure 32 and contains a discharge passage 52 connecting with a thin annular passage 54 surrounding the top of the finger shaped lower portion 56 of the support 44. Surrounding the annular passage 54 is an electric heater 58 which is imbedded in the plastic and provides sufficient heat to prevent the freezing of the water in the annular passage 54, the discharge passage 52 and the trough 42. In addition, the finger shaped portion 56 of the support 44 is provided with a U-shaped loop sheathed electrical heater 60 extending from the top to the bottom and back to the top of the support 44.

Figure 5:
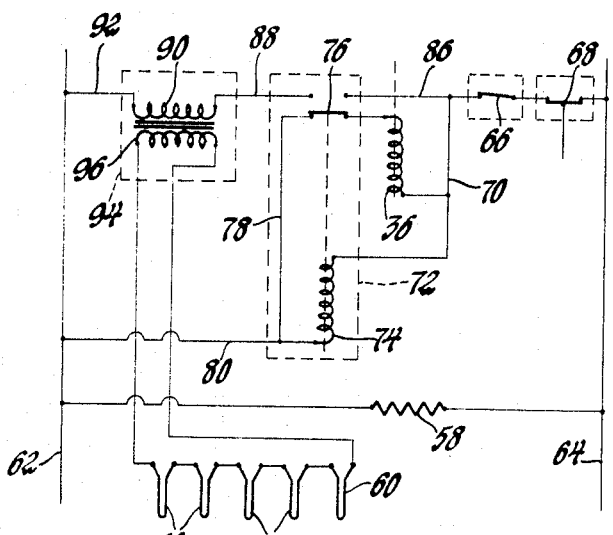
FIGURE 5 is a wiring diagram.

As shown in the wiring diagram, FIGURE 5, the electric heaters 58 constituting the second heaters are connected directly across the supply conductors 62 and 64 so that they will continuously energize to prevent freezing of water within the water passages 52 and 54 at all times. This heat should be limited to no more than is necessary to prevent freezing. The enclosure 32 is provided with a thermostatic switch 66 which is connected in series with a weight operated stop switch 68 to the supply conductor 64 so that the opening of either of these switches will stop the operation of the liquid freezer or ice maker with the exception of the second heaters 58. The thermostatic switch 66 connects through the conductor 70 to a clock type timer 72 containing an electrically operating timer mechanism 74 which operates a double throw switch 76 from its lower position to its upper position at the end of a predetermined timed freezing period. In its lower freezing position the switch 76 connects the operating coil of the solenoid valve 36 with the conductors 78 and 80 connecting with the supply conductor 62 to keep open the valve 36 during the freezing period. The timer 72 is also connected through the conductor 80 to the second supply conductor 62.

The weight stop switch 68 will remain closed as long as the collecting bin 82 is present and unfilled. The thermostatic switch 66 will remain closed as long as the temperature within the compartment 24 remains sufficiently cold to accomplish the rapid freezing of water, that is, the switch 66 will remain closed at all temperatures below 10° F. but will open at temperatures above 10° F. to prevent operation when rapid freezing cannot be performed. The energization of the solenoid valve 36 will provide a slow measured flow of water through the water manifold 38 and each of the branch distributing tubes 40 to each of the troughs 42 of each of the supports 44. This water preferably will drop by drops into the trough 42 and pass through the passage 52 onto the upper portion of the finger shaped portion 56 of the supports 44. This water will flow in a thin film down over the outer surface of the supports 44 and be exposed on the vertical surfaces of the fingers to the forcible horizontal circulation of cold air within the compartment 24. This will cause the water to freeze in very thin layers on the surface of each of the supports 44. This type of freezing allows the escape of dissolved air and gas from the water as it is frozen. In this preferred type of freezing, the water or other liquid to be frozen is supplied to each support at a rate which is equal to or less than the rate that it can be frozen onto the surface by the flow of the cold air. Additional water will continue to freeze in thin layers like an icicle over the water previously frozen until it accumulates to a sufficient size as indicated by the dot dash outline 84 of a completed ice pellet. This method of freezing minimizes the clouding effect of dissolved air in the water in the manner similar to an icicle and thereby improves the clarity of the ice formed. If desired, the water may be supplied at a slightly greater rate than it can be frozen with the excess dripping from the ends of the supports and carrying away any sediment.

Figure 2:
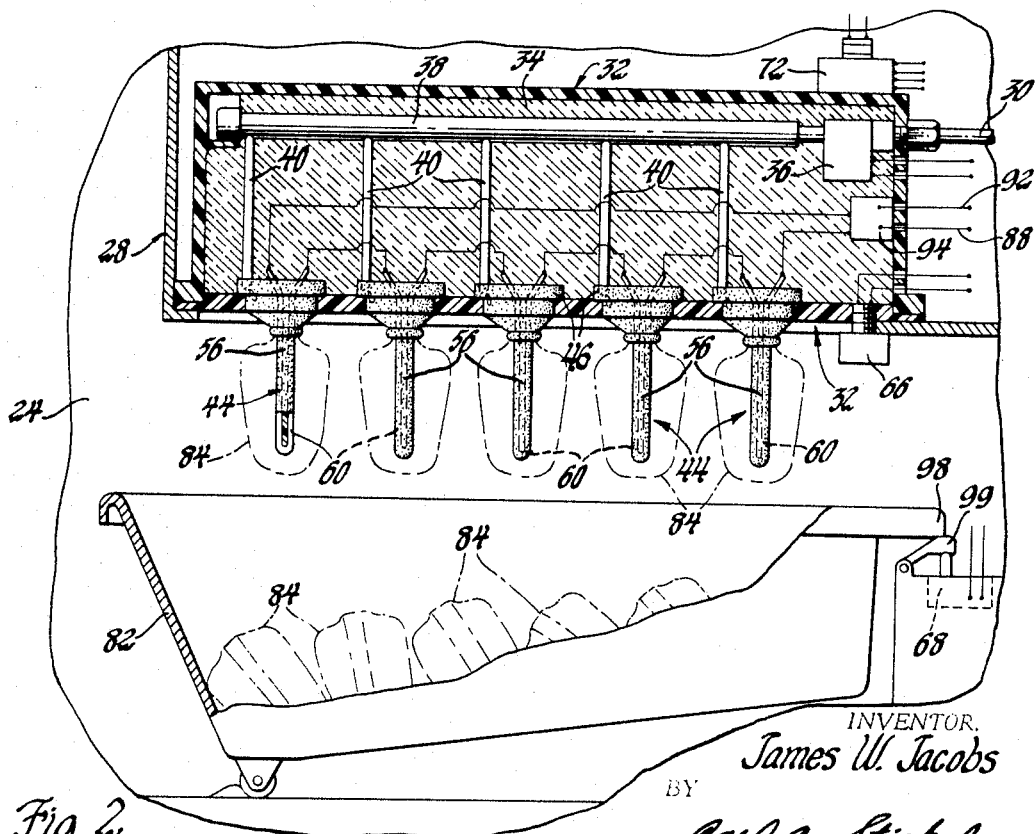
FIGURE 2 is a vertical longitudinally extending sectional view of the liquid freezer taken along the line 2—2 of FIGURE 1.
Figure 3:
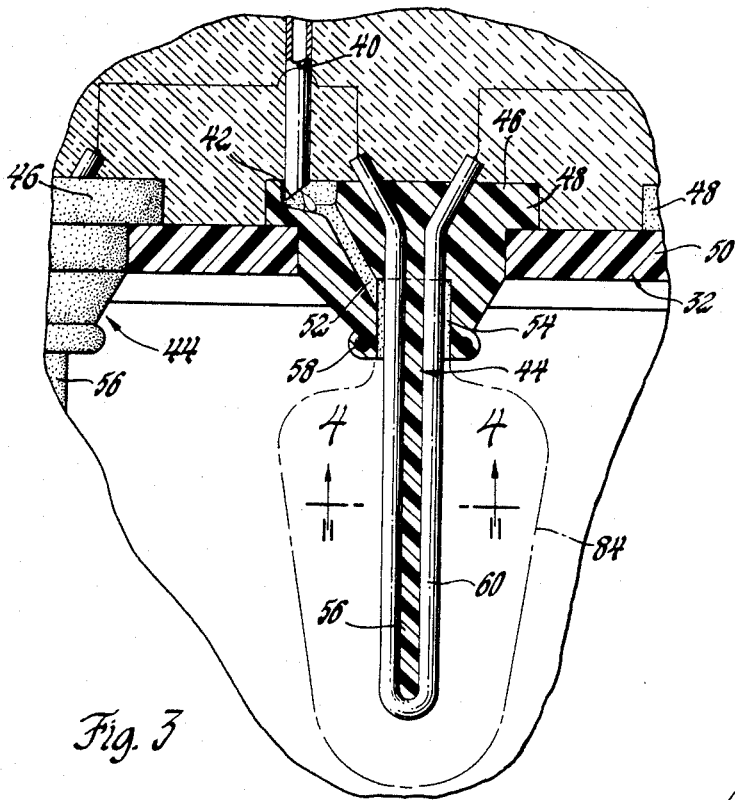
FIGURE 3 is an enlarged sectional view of one of the fingers and the associated liquid feed and heaters.
Figure 4:
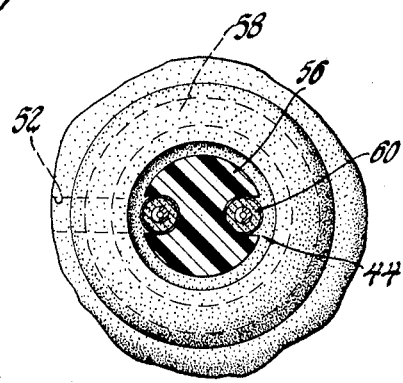
FIGURE 4 is a longitudinal sectional view of one of the fingers taken along the line 4—4 of FIGURE 3.

After a suitable period of freezing time, the ice pellets 84 are sufficient in size. Then the timer operates to move the switch 76 from its lower position terminating the freezing period to its upper position where it connects the branch conductor 86 with the conductor 88, the primary winding 90 and the conductor 92 connecting with the supply conductor 62 to initiate a thawing ice relasing period. The solenoid valve 36 is thereby disconnected from the branch conductor 78 and is deenergized to cause it to close and stop the water flow. The transformer 94 has a secondary winding 96 which is connected to the first electric heaters 60 extending along the finger shaped portions 56 of the supports 44 to heat the surface of the supports 46 sufficiently to cause the release of the frozen pellets 84. This allows thef rozen pellets to fall into the bin 82 as shown in FIGURE 2. When sufficient time has elapsed for this thawing release to be accomplished, the electrical operating mechanism 74 of the timer 72 returns the switch 76 to its lower position thereby discontinuing the energization of the first heater 60 and reenergizing and reopening the solenoid valve 36 to resume the water flow and to begin the freezing of a new set of pellets.

When the bin 82 is substantially filled, the rim 98 thereof acting through a follower 99 will open the weight switch 68 to prevent the energization of all of the system excepting the second electric heater 58. The weight switch 68 will then remain open to stop further ice making until some or all of the ice pellets 84 are removed therefrom.

While the embodiment of the invention as herein disclosed constitute preferred forms, it is to be understood that other forms might be adopted.

What is claimed is as follows:

1. A liquid freezer including a plurality of downwardly extending supports for frozen liquid having the general shape of fingers, a plurality of annular liquid feed means surrounding the upper portions of said fingers for slowly discharging liquid to be frozen onto the external surface of the upper portion of each of said supports, means for freezing the liquid upon the external surface of said supports, means for heating said annular liquid feed means for discharging liquid adjacent said supports for preventing the freezing of the liquid adjacent the upper portion of each of said supports, each of said supports being provided with electrical heating means extending to its lower portion for freeing the frozen liquid therefrom.

2. A liquid freezer including a support for frozen liquid provided with a downwardly extending external freezing surface, liquid feed means for discharging liquid to be frozen downwardly onto the upper portion of said downwardly extending freezing surface for downward flow, wherein the improvement comprises means for cooling air below the freezing temperature of the liquid and circulating the cooled air in heat transfer with the liquid upon the external freezing surface to freeze said liquid thereon, and temperature responsive means responsive to a predetermined high temperature of said circulating cooled air for stopping the discharge of the liquid to be frozen onto said freezing surface.

3. A liquid freezer including a support for frozen liquid provided with a downwardly extending external freezing surface, liquid feed means for discharging liquid to be frozen downwardly onto the upper portion of said downwardly extending freezing surface for downward flow, wherein the improvement comprises means for cooling air below the freezing temperature of the liquid and circulating the cooled air in heat transfer with the liquid upon the external freezing surface to freeze said liquid thereon, heating means for heating said freezing surface to remove the frozen liquid therefrom and timer means for periodically stopping the discharge of liquid onto said freezing surface and energizing said heating means for a period.

4. A liquid freezer as defined in claim 3 in which the timer means comprise means effective at the end of the period for discontinuing the energization of said heating means and resuming the discharge of liquid onto said freezing surface.

5. A liquid freezer including a plurality of downwardly extending supports for frozen liquid having the general shape of fingers extending continuously downward, a plurality of liquid conduit feed means for discharging liquid to be frozen each extending separately onto the upper portion of the external surfaces of said plurality of supports, means for cooling air below the freezing temperature of the liquid and circulating the cooled air in heat transfer with the liquid flowing down said supports for freezing the liquid upon the external surfaces of said supports, each of said supports being provided with electrical heating means for freeing the frozen liquid from said supports for sliding therefrom under gravitational force, means for stopping the flow of liquid onto the upper portion of said external surfaces, and means effective coincidentally to the stopping of liquid flow for energizing said heating means for freeing the frozen liquid for sliding from said supports under gravitational force.

6. A liquid freezer wherein the improvement comprises a preponderantly and continuously downwardly extending support of electrical insulating material having external freezing surfaces, electrical heating means extending along said support in heat conducting relation to said freezing surfaces, the upper portion of said support being provided with liquid conduit feed means of insulating material for slowly discharging liquid onto the upper portion of said support for downward flow on said external freezing surfaces, means for freezing the flowing liquid upon said support, means for stopping the flow of liquid from said liquid feed means onto the said support, and means effective upon the stopping of said liquid flow for energizing said electrical heating means for freeing the frozen liquid for sliding from said support under gravitational force.

(References on following page)

References Cited

UNITED STATES PATENTS

| | | | |
|---|---|---|---|
| 2,995,017 | 8/1961 | Breeding | 62—351 X |
| 1,247,821 | 11/1917 | Graf | 62—347 |
| 2,487,408 | 11/1949 | Askin | 62—344 X |
| 857,841 | 6/1907 | Sprague | 62—347 |
| 2,319,523 | 5/1943 | Trigg | 62—74 |
| 2,431,916 | 12/1947 | Caesar | 62—345 X |
| 2,435,285 | 2/1948 | Lucia | 62—344 X |
| 2,585,240 | 2/1952 | Grow | 62—344 |
| 2,722,110 | 11/1955 | Denzer | 62—73 |
| 3,048,986 | 8/1962 | Archer | 62—347 X |
| 3,080,726 | 3/1963 | Tenniswood | 62—347 X |
| 3,152,453 | 10/1964 | Hamilton | 62—74 X |
| 3,220,214 | 11/1965 | Cornelius | 62—347 |

ROBERT A. O'LEARY, *Primary Examiner.*

WILLIAM E. WAYNER, *Assistant Examiner.*

U.S. Cl. X.R.

62—233, 347, 351; 321—45